H. C. HARRISON.
FERROSILICON PRODUCT AND METHOD OF CONTINUOUSLY PRODUCING THE SAME.
APPLICATION FILED DEC. 1, 1909. RENEWED SEPT. 1, 1914.
1,134,128.
Patented Apr. 6, 1915.
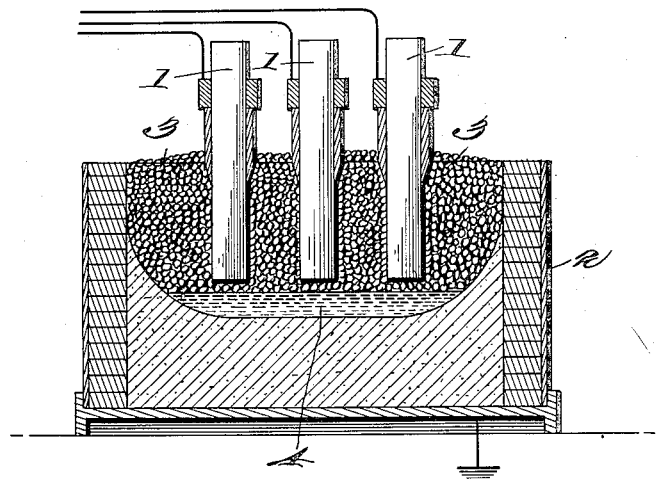

UNITED STATES PATENT OFFICE.

HERBERT CHAMPION HARRISON, OF LOCKPORT, NEW YORK, ASSIGNOR, BY MESNE ASSIGNMENTS, TO ELECTRO METALLURGICAL COMPANY, A CORPORATION OF WEST VIRGINIA.

FERROSILICON PRODUCT AND METHOD OF CONTINUOUSLY PRODUCING THE SAME.

1,134,128.     Specification of Letters Patent.     Patented Apr. 6, 1915.

Application filed December 1, 1909, Serial No. 530,737. Renewed September 1, 1914. Serial No. 859,722.

*To all whom it may concern:*

Be it known that I, HERBERT C. HARRISON, a subject of His Majesty the King of Great Britain, residing at Lockport, in the county of Niagara and State of New York, have invented certain new and useful Improvements in Ferrosilicon Products and Methods of Continuously Producing the Same; and I do hereby declare the following to be a full, clear, and exact description of the invention, such as will enable others skilled in the art to which it appertains to make and use the same.

This invention relates to crystalline ferrosilicon products and methods of producing silicides of iron economically and continuously of any desired silicon content, and has for its object in particular the production in a crystalline form of a silicide of iron which will correspond substantially to the formula $Fe_3Si_7$ or 54.2 per cent. silicon.

With these objects in view the invention consists in the novel method and product hereinafter more fully disclosed and particularly pointed out in the claims.

Referring to the drawing forming a part of this specification, in which the figure illustrates a conventional form of an electric furnace suitable for carrying out the process, and for producing the product, 1 represents suitable electrodes, 2 the furnace, 3 the charge, and 4 the molten product.

In carrying out the method the ferrosilicon charge is so proportioned in the well known manner that the total silicon content of the silica combined with the iron will form a silicide or alloy of iron and silicon of the desired silicon content. This charge is then heated in an electric furnace in the usual way, the heat energy entering the furnace being so proportioned to the size of the furnace that practically all the silicon content of the mixed silica and iron will unite with the iron, either chemically or as an alloy.

For any particular furnace the amount of energy necessary can be conveniently determined by experience. But a better way is to increase the input of power from an amount known to be too small up to a point at which the products of the reaction appear combined without an appreciable loss of material other than that of carbon.

To illustrate the principle involved, attention is called to the fact that even though chemically the furnace charge may be correctly proportioned, yet if the power input to the furnace is insufficient, the silica will be reduced more slowly than the iron that is melted out of the charge material can find its way to the molten bath at the furnace bottom; and, therefore, a product will be yielded in which all the iron will appear but not all the silicon which should have resulted from the charge. If on the other hand too much power is employed the result will be to waste the silicon by volatilization, and again the maximum yield of silicon will not be obtained. Therefore, the principle underlying the method requires that only sufficient power be employed to reduce the silicon just so fast and no faster than the iron which is melted out of the charge material finds its way to the bottom of the furnace. Only when these conditions are complied with can a furnace be continuously employed to make any desired uniform percentage of material. But of course, the same result, at a lower efficiency, can be obtained where the power is incorrectly proportioned if one is willing to waste the reduced silicon by volatilization from a charge containing more silicon than is necessary, or if he is willing to continually correct by an omission of iron and an increase of carbon the tendency that a deficiency of power has to reduce the silicon content of the product.

Every design of furnace, of course, differs in the amount of power necessary for the best results owing to the special conditions involved, the rate of radiation of heat, and the spacing and size of the electrodes; so the best that can be done is to first design a furnace from the best knowledge previously obtained from practice, and afterward ascertain by trial and error what amount of power will effect the total reaction without undue loss of silicon by volatilization. Within rather wide limits the voltage of the current employed may be altered, and this will entail either a different spacing of the electrode, or in cases where this is impossible it will compel a variation in the excess of fixed carbon in the charge over that theoretically needed to effect reduction of the silicon. It will, therefore, be clear that it is exceedingly difficult if not impossible to give a specific example accompanied by accurate data, but at the same time, those skilled in this art will find no difficulty in carrying out this invention if they will bear in mind that:—In the manufacture of ferrosilicon from silica, quartz, scrap iron or steel, and carbon in the form of charcoal, or of charcoal and coke, the following general principles have to be observed to obtain a maximum efficiency; and that most of these rules although applicable in general to the manufacture of alloys in an electric furnace, are yet more particularly applicable where, as in the case of ferrosilicon the more volatile constituent of the resulting product is reduced from the ore, and is itself volatile when compared with the other constituents of the alloy, which may be comparatively stable metals at the temperature to which they are subjected in the furnace. The principles in question are:—

(1) The silicon and iron should be proportioned in the charge in the same ratio that they are required to be proportioned in the finished product.

(2) The amount of fixed carbon in the charge will be always in excess of that necessary theoretically to effect a reduction of the silica, but the minimum possible excess of carbon will be employed always provided that the charge material may be prevented from bridging in the furnace, thus insuring a free feeding of the charge material to the zone of reduction, and at the same time the electrodes may be allowed to remain constantly low in the furnace, thereby maintaining the zone of reduction as low as may be practically safe.

(3) The electrical energy fed into any given furnace will vary directly with the silicon percentage of the alloy required to be made, as also will the temperature attained inside the furnace, and consequently the temperature of the resulting product. That is to say, for every given percentage of silicon in the resulting alloy under the working conditions outlined above, there will be a critical temperature at which the metal will run from the tap hole and which temperature increases as the silicon content of the alloy increases. Heat conditions of the furnace must always be such that protecting walls form themselves out of the slag and semi-reduced charge material of such a thickness as to be practically independent of the containing furnace walls, and yet are of such thickness as to render the tapping of the furnace a simple and expeditious operation.

(4) To a considerable extent the iron will be melted out of the charge from zones of comparatively low temperature and which are higher up in the furnace than where the conditions are such as to reduce the silica; and the iron so melted will drip downward collecting the reduced silicon, and acting as a silicon carrier up to the point of the saturation of iron with silicon. If this saturation point occurs at the silicon percentage of approximately 53.5 per cent. to 54 per cent. silicon, a chemical compound corresponding to the formula $Fe_3Si_7$ may be isolated in definite crystalline form. Up to this point the amount of silicon contained in the product is constant under correct working conditions for any given amount of power put into the furnace irrespective of whether the alloy produced contains much or little silicon, between the limits of an alloy containing 30 per cent. to 54 per cent. silicon. And up to this saturation point when working with pure materials the product is solid and coherent, but immediately beyond this point the material disintegrates, showing that the iron has been supersaturated with silicon. At higher percentages of silicon the product again becomes solid, practically pure silicon being very tough and solid. An abrupt change in the color of the alloy occurs approximately at the percentage of 54 per cent. silicon. Below this the alloy is of a bright steel color, while above this point the alloy assumes the bluish gray color characteristic of silicon. Above the limit of 54 per cent. silicon in an alloy the silicon appearing in the product under correct working conditions of manufacture for any given amount of power put into the furnace decreases continuously in proportion as the silicon percentage of the alloy increases, showing that when the quantity of iron acting as a carrier is small, an excessive loss of silicon occurs by volatilization.

In the particular case of the manufacture of a crystalline product corresponding to the formula $Fe_3Si_7$ the charge is so proportioned that the silicide resulting should be of silicon content between 53 per cent. and 54.5 per cent. silicon; and if the power input to the furnace is properly adjusted to the size of the furnace, and the carbon for reduction purposes accurately proportioned to the working conditions of the furnace the critical temperature suitable for a continuous production will be attained in the furnace; and a practically pure crystalline product may be continuously tapped out, in which when cooled and broken up are found matrices filled with bright, shining, hard brittle crystals, in a plate form which analyze about 54.2 per cent. silicon, depending upon whether the particular matrix selected is relatively rich or poor in silicon. If the matrices are melted and permitted to cool, these crystals invariably solidify first which tends to show that they have a higher melting point than the ferrosilicon alloys on either side of the same. Crystals from the poorer matrices probably contain about .7 per cent. of impurities, while crystals from rich matrices analyze practically 54.2 per cent. silicon, corresponding to the formula $Fe_3Si_7$, taking the atomic weight of iron as 55.9, and of silicon as 28.4. These crystals are, of course, a much purer compound of iron and silicon than the usual commercial alloys, and, therefore, they offer special advantages in metallurgy, over the regular alloys of say 25 to 60 per cent. silicon. They contain less carbon and phosphorus than do such alloys, and having a slightly higher melting point than the impurer alloys they are less likely to lose their silicon during the process of purifying the metal. In other words, it is well recognized in metallurgy, that it is very important to obtain the purest product possible and it is obvious that a crystalline product of this nature is purer than the chance alloys heretofore employed. It is also probable that when the silicon is liberated from a chemical compound, as is the case here, it being in a nascent state, so to speak, that it will be more active chemically in the molten iron than would be the case were it merely liberated from an alloy.

In many cases the crystals need not be separated from their matrices before being used, for the mixture consisting of the crystals and matrices can always be depended on to analyze substantially between 53 and 54.5 per cent. of silicon, which is a product sufficiently pure for many purposes.

If the charge is made up so as to produce other than 53 to 54.5 per cent. of silicon the crystal product becomes less, and it can be made so widely different from this silicon content that the crystal product will disappear entirely.

Of course, it is understood that those skilled in the art may vary the details of procedure without departing from the spirit of my invention, and, therefore, I do not wish to be limited to such details except as may be required by the claims.

What I claim is:—

1. The method of continuously producing ferrosilicon of a required proportion of silicon and iron, which consists in suitably proportioning the silicon content of the charge material to the iron content of the charge material in the same ratio as is required by the resulting product; supplying carbon in excess of that required to theoretically effect a reduction of the silica and other oxidizable constituents of the charge, but sufficient to prevent the charge material from bridging between the electrodes, thereby causing a free feeding of the charge material to the zone of reduction and in causing the iron to be melted out of the charge material only so fast as the silica is reduced and to gravitate to the reduced silicon, substantially as described.

2. The method of continuously producing ferrosilicon of a required proportion of silicon and iron, which consists in proportioning the silicon content of the charge material to the iron content of the charge material in the chemical ratio required by the resulting product; supplying carbon in excess of that required to theoretically effect a reduction of the oxidizable constituents of the charge, but only in an amount sufficient to prevent the charge material from bridging between the electrodes, thereby causing a free feeding of the charge material to the zone of reduction and at the same time avoiding an undue rise of temperature in said zone and in causing the iron to be melted out of the charge material only so fast as the silicon is produced, to gravitate to the reduced silicon and to act as a carrier of silicon up to the point of saturation of iron with silicon, substantially as described.

3. The method of producing continuously ferrosilicon of a definite proportion of silicon and iron, which consists in suitably proportioning the size of the furnace with respect to the heat energy to be used and to the percentage of silicon required in the finished product; in maintaining a maximum zone of reduction at substantially the lowest point of the charge; causing the iron to be melted out of the charge material from a point above the said maximum zone and to gravitate to the molten bath below said zone only so fast as the silicon is reduced, substantially as described.

4. The method of producing continuously ferrosilicon of a definite proportion of silicon and iron, which consists in proportioning the size of the furnace to the electrical energy required to be employed and inversely to the silicon percentage of the required alloy; maintaining the maximum zone of reduction in the furnace at substantially the lowest portion of the charge material; permitting the iron to be melted out of the charge material above said maximum zone and to gravitate to the molten bath at the bottom of the furnace at a rate bearing the same ratio to the rate of silicon reduction that the quantity of iron in the charge material bears to the quantity of silicon in the charge material, substantially as described.

5. The method of producing continuously ferrosilicon of any definite required proportion of silicon and iron which consists in suitably controlling the temperature in the furnace for any required percentage of silicon alloy and in such a manner as to produce a critical temperature in the zone of reduction; increasing said temperature as the silicon content of the alloy produced increases; in determining at what point during the increase of temperature the constituents of the resulting product bear to each other the same ratio that they bore in the charge material; and in maintaining said temperature at that point, substantially as described.

In testimony whereof I affix my signature in presence of two witnesses.

HERBERT CHAMPION HARRISON.

Witnesses:
L. B. PATTERSON,
HARRIETT G. HUSTON.